Patented Oct. 2, 1951

2,570,094

UNITED STATES PATENT OFFICE 2,570,094

ALKYLOLAMINE AND MORPHOLINE SALTS OF POLYMERIZED OLEFIN SULFONIC ACIDS

Harris Walton Bradley, Bellefonte Heights, Del., assignor to E. I du Pont de Nemours and Company, Wilmington, Del, a corporation of Delaware No Drawing. Application March 28, 1950, Serial No. 152,510

10 Claims. (Cl. 260—79.3)

This invention relates to novel compositions of matter adapted for use as film-forming agents in protective coating compositions and similar uses. More particularly, this invention deals with novel compounds derived from olefine polymers.

It is an object of this invention to produce from polyethylene, polybutylene and similar polyolefines, novel compounds or compositions of matter which are characterized by their capacity of producing continuous, thermoplastic, non-saponifiable films, and whose solubility characteristics are controlled and predetermined according to this invention. Various additional objects of this invention will become apparent as the description proceeds.

U. S. Patent No. 2,212,786 to McQueen teaches a process for producing polysulfonyl derivatives of polythenes and related olefinic polymers, by treating said polymers with a mixture of gaseous chlorine and sulfur dioxide while under the influence of actinic light. The products, which contain also directly combined chlorine, are then hydrolyzed to convert the $SO_2Cl$ groups into alkali-metal sulfonate groups. In this form the products are soluble in water and are useful as tanning agents. They are not useful, however, for producing protective coatings, adhesives and similar articles, inasmuch as said alkali-metal sulfonates do not have the property of producing useful continuous films.

I have now found that polysulfonyl chlorides of the types produced by McQueen are capable of being converted into film-forming, thermoplastic substances of controlled solubility characteristics, as more fully explained below, by reacting them with oxy-amine compounds, such as the polyalkanol amines and the morpholines, in the presence of water, to simultaneously hydrolyze said $SO_2Cl$ groups and convert the resulting sulfonic acid groups into the corresponding oxy-amine salts.

More particularly, a polyolefine, chlorosulfonylated according to said McQueen patent to a pont where its sulfur analysis is somewhere between 2 and 7%, is suspended in a mixture of an alcohol and water, and treated there with an oxyamine as defined below, to neutralize at least 80% of the $SO_3H$ groups formed in situ by hydrolysis. The reaction mass is then concentrated to form a solution of convenient volume, which may be handled as such in commerce for various purposes. For instance, it may be used directly as a protective coating for paper, textiles, etc.; or it may be incorporated with pigments and other conventional ingredients to produce a paint or lacquer.

The solubility characteristics of the resulting composition and, to that extent, its ultimate utility are controlled by the sulfur content of chlorosulfonylated polyolefine selected for treatment. If the sulfur analysis is, roughly speaking, between 4 and 7%, and if the neutralization with the amine is essentially complete, the product is water-soluble. Such products therefore are of special interest where a water-soluble protective film is desired; for instance, for sizing yarn or textile fiber to protect them against mechanical abrasion during subsequent working, such as weaving. In such cases it is desirable that the protective film be water-soluble, so that it may be readily washed out after weaving.

On the other hand a sulfur analysis of 3 to 4% will generally result in film-forming compositions which have limited solubility in water, and may be thinned sufficiently for working purposes by the aid of an alcohol-water mixture, such as aqueous ethanol or isopropanol. When such a thin solution or suspension is applied to a suitable surface, say glass, metal, paper or textile fiber, it dries to a water-insoluble film. Such a composition is obviously best adapted for uses where a permanent protective coating is desired, such as in a paint, size or lacquer. If the sulfur content is between 2 and 3%, the resulting product is still more tacky and dries to a still more water resistant film.

It will be understood, of course, that the above limits of sulfur content are relative. They will vary somewhat with the nature of the polymer selected, for instance whether a polyethylene or a polybutylene; and it will also depend on one's viewpoint as to what constitutes a sufficiently water-soluble or water-insoluble film for a given purpose. But with any given polymer, the optimum sulfur content for a given solubility effect can be readily determined by a few simple experiments.

As concerns the molecular weight, McQueen mentions ethylene polymers having molecular weights from 1000 to 24,000 or even higher up to 40,000, and he mentions a molecular weight of 7000 in connection with polyisobutylene. Practically any of these will work well in my invention, and as for the upper limit, this is determined simply by commercial availability or cost. Isobutylene polymers of 80,000 or even up to 200,000 have been mentioned in the literature. Except for economic considerations, there is no reason to exclude any of these higher polymers, provided they have the optimum sulfur content. But for the sake of insuring good tackiness of film in all instances, I recommend a lower limit of about 5000 average M. W. in polythene and about 10,000 in polybutylenes. This corresponds to an average chain of about 180 $C_2H_4$ or $C_4H_8$ units, respectively, in the minimal polymer selected for the purpose of this invention.

The chlorosulfonylation may be effected as taught by McQueen, that is by reacting upon the polymer in an organic solvent, such as carbon tetrachloride, with a gaseous mixture of chlorine and sulfur dioxide under the influence of actinic light. Treatment is continued until the desired sulfur analysis has been achieved, which indicates introduction of a corresponding number of $SO_2Cl$ radicals per molecule. Inevitably, a large quantity of chlorine is simultaneously introduced into the product, but I found this to make no objectionable difference on the physical and utilitarian qualities of the product.

Now, as for the oxy-amine selected for neutralization, this may be defined as being a member of the group comprising on the one hand the polyalkanolamines of the general formula

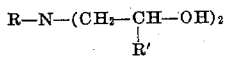

wherein R' is H or $CH_3$ and R is H, $CH_3$ or a third alkanol radical of form

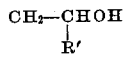

and comprising on the other hand the morpholines, such as morpholine itself and N-methyl morpholine:

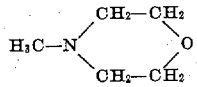

Usable are also other compounds which contain at least two alkanol groups attached to nitrogen, for instance di(N-hydroxyethyl)-piperazine:

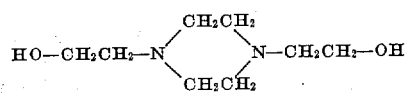

All these are well known in the art as a natural group of equivalents, not only because all have radicals of the structure N—C—C—O in their atomic make-up, but also because they all act alike in producing soaps of high emulsifying properties when reacted with a higher fatty acid, for instance oleic acid. Thus, diethanolamine oleate, triethanolamine oleate and morpholine oleate have been renowned for a number of years as outstanding emulsifying agents.

Without limiting my invention, the following examples are given to illustrate a few preferred embodiments thereof.

*Example 1*

A solution of 250 grams of polyisobutylene, having a molecular weight of about 20,000, in 2250 grams of carbon tetrachloride was charged into a 5 l. flask. A mixture of 71 grams of chlorine and 120 grams of sulfur dioxide was passed into the agitated charge at 25° C. over a period of 50 minutes after which the sulfur dioxide flow was stopped, the temperature increased to 60° C., and 171 grams more chlorine passed in over an additional period of 2 hours. The reaction mass was irradiated at all times with actinic light from two 150 watt projector lamps. Carbon tetrachloride was removed from the gassed charge by distillation under reduced pressure until the high viscosity of the concentrated mass made stirring difficult. The concentrate weighed 1298 grams and contained 36% solids which showed an analysis of 2.1% sulfur and 41% chlorine.

To 1258 grams of this polyisobutylene sulfonyl chloride concentrate (450 grams active ingredient) were added 2000 grams of 50% isopropanol solution in water and 70 grams of diethanolamine, and the mixture was concentrated by distillation at atmospheric pressure to a weight of 1793 grams. The concentrate, which was a rather viscous, clear, straw-colored liquid at 50° C., was thinned out by adding 538 grams of 38% isopropanol to yield 2050 grams of a water-thin solution having a solids content of 22%.

The reactions taking place in the above process may be formulated as follows:

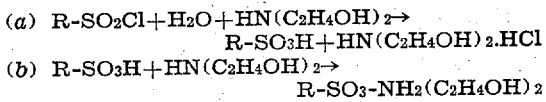

R in these equations represents so much of the isobutylene polymer molecule as goes with one $SO_2Cl$ group (i. e. about 15 $C_4H_8$ units).

Computing the results on the basis of this assumption, the above water-thin solution seemed to contain 20% by weight of polyisobutylene diethanolamine sulfonate and 2% of diethanolamine hydrochloride. The solution is extendable with water and dries to a rather hard, non-tacky but flexible film which is only slightly swelled by immersion in water for 24 hours at 25° C., is insoluble in isopropanol, but dissolves slowly in a 50:50 mixture of isopropanol and water. As a coating on paper, this product produced a washable, grease-resistant coating, suitable as a wall paper protective coating. When pigmented with titanium dioxide it provides an aqueous paint which shows excellent alkali resistance as a masonry and concrete paint.

*Example 2*

A solution of 426 grams of polyisobutylene sulfonyl chloride (S=4.2%; Cl=36%) in 1100 grams of carbon tetrachloride was prepared according to the procedure of Example 1 except that a mixture of 229 g. of sulfur dioxide and 146 grams of chlorine was passed in during one hour and forty-five minutes at 25° C. during the first gassing stage, and 53 grams of chlorine were passed in at 60° C. over a one-hour period in the second gassing stage. To 1476 grams of the solution thus formed (413 grams of active ingredient) were added 910 grams of 50% aqueous isopropanol and 150 grams of diethanolamine; distillation was then carried out as in Example 1 until the clear light yellow concentrate became thick. At this point 490 grams of 10% isopropanol solution were added, to thin out the material. The resulting product weighed 1829 grams and contained 25% polyisobutylene diethanolamine sulfonate and 8% diethanolamine hydrochloride.

The above aqueous product gave upon drying a soft, pliable, non-tacky film which was insoluble in cold water, but soluble in water at 80° C. The increased solubility of this product over that of Example 1 is due to the greater number of water solubilizing groups, which is determined by the sulfur content of the sulfonyl chloride. The softer nature of the film is probably due, at least in part, to the lower chlorine content compared to the product in Example 1.

Example 3

Polyisobutylene sulfonyl chloride containing 7.9% sulfur and 41% chlorine was prepared as in the preceding examples by gassing a solution of 500 grams of polyisobutylene (about 20,000 M. W.) in 5090 grams of carbon tetrachloride at 25°–35° C. with a mixture of 823 grams of sulfur dioxide and 482 grams of chlorine. A solution of 500 grams of the polymeric sulfonyl chloride in 1010 grams of carbon tetrachloride was treated with 1820 grams of 50% aqueous isopropanol, and 334 grams of diethanolamine were added, which was enough to adjust the pH to a faint pink color on phenolphthalein indicator paper. The charge was concentrated by distillation until it weighed 1730 grams. This product was a rather viscous syrup, which contained 35% polyisobutylene diethanolamine sulfonate and 10% diethanolamine hydrochloride. A film of the product when evaporated was very soft and tacky and was soluble in cold water. The high water solubility of this product is attributed to the relatively large number of amine sulfonate groups, as measured by the sulfur analysis.

Example 4

By gassing a solution of 500 grams of polyisobutylene (about 20,000 M. W.) in 4500 grams of carbon tetrachloride at 25° C. under the influence of actinic light with a mixture of 234 grams of sulfur dioxide and 158 grams of chlorine over a period of one and three-quarters hours, a polyisobutylene sulfonyl chloride was obtained, analyzing 3.9% sulfur and 24% chlorine. To a solution of 758 grams of this sulfonyl chloride in 1140 grams of carbon tetrachloride, 1820 grams of 50% isopropanol and 165 grams of diethanolamine were added, and the charge was worked up as in the preceding examples to give 2740 grams of a product containing 30% by weight of polyisobutylene diethanolamine sulfonate. This solution was extendable with water, but dried to a tacky, elastic film which was insoluble in water. The tack of this film in contrast to that in Example 1 is attributed to the much lower chlorine content of the resin in the instant case.

Example 5

A sample of butyl rubber, (a polymerized isobutylene containing 1 to 3% isoprene and having a molecular weight in the range 40,000–80,000), was purified by dissolving in carbon tetrachloride and precipitating with ethanol. 245 grams of the purified butyl rubber were then dissolved in 2820 grams of carbon tetrachloride and treated as in the preceding examples with a mixture of 445 grams of sulfur dioxide and 308 grams of chlorine at 25° C. over a period of two hours and twenty-five minutes. Analysis on the resulting sulfonyl chloride showed 4.3% sulfur and 25% chlorine. To a solution of 148 grams of this product in 287 grams of carbon tetrachloride at 40°–45° C., 65 grams of diisopropanolamine were added. When the charge had become homogeneous by stirring for about 3 minutes, 1100 grams of 50% isopropanol were added and the mass was concentrated as in preceding examples to a weight of 843 grams. The concentrate was a translucent, water-thin, brownish-yellow liquid that was faintly alkaline to Brilliant Yellow indicator paper. On the basis of the sulfur content of the sulfonyl chloride it contained 20% butyl rubber diisopropanolamine sulfonate and 4% diisopropanolamine hydrochloride. The product was dispersible in water and produced a silghtly tacky film, which was water insoluble.

Example 6

A sample of polythene sulfonyl chloride containing 5.5% sulfur was prepared from a low molecular weight polythene having a viscosity of 125 poises at 125° C. (approximately 9,000 M. W.), by gassing a solution of 1000 grams of the polythene in 11,200 grams of carbon tetrachloride at 65°–70° C., over a period of six hours and fifteen minutes, with a mixture of 1308 grams of chlorine and 1624 grams of sulfur dioxide while irradiating the reaction flask with two 150 watt projector lamps. A solution of 240 grams of this sulfonyl chloride in 318 grams of carbon tetrachloride was added to a solution of 110 grams of diisopropanolamine in 750 grams of water at 35° C. The resulting non-homogeneous, curdy mixture was concentrated by distillation under vacuum using a 65° C. water bath. The charge in the flask passed through several changes in physical appearance but finally became a clear, rather viscous solution with a light greenish-yellow cast. It weighed 934 grams. This charge was then diluted with water to a weight of 1435 grams, which corresponds to a concentration of 20% polythene diisopropanolamine sulfonate. This product produced a soft, limp film which was slowly water soluble. Paper treated with the aqueous product acquired resistance to penetration by grease.

Example 7

A sample of polythene sulfonyl chloride containing 5.5% sulfur was prepared from a low molecular weight polythene having a viscosity of 125 poises at 125° C. (approximately 9,000 M. W.) according to the same general procedure as in Example 7. The sulfur analysis corresponds to a molecular weight of approximately 570 for each unit containing a sulfonyl chloride group. Into a 1 liter agitated flask was placed a solution of 23 grams of the above polythene sulfonyl chloride (0.04 mol sulfonyl chloride) in 41 grams of carbon tetrachloride. Then 100 grams of 50% isopropanol were added at room temperature, and the mixture was stirred for five minutes, after which 9.5 grams of methyl diethanolamine (0.08 mol) were added. The charge was concentrated by distillation at atmospheric pressure to give 105 grams of a solution of polythene methyl-diethanolamine sulfonate in a mixture of isopropanol and water.

Example 8

The experiment in Example 8 was repeated except that 8.1 grams of methyl morpholine (0.08 mol) were used in place of methyl diethanolamine. After distillation, there remained 125 grams of a solution of the soluble amine salt in the alcohol-water mixture.

Example 9

When 7 grams of morpholine (0.08 mol) were used instead of methyl morpholine in Example 8, the charge after distillation to about 150 grams was not quite soluble, but on the addition of 315 grams of 85% isopropanol and again concentrating the charge to a weight of 170 grams, the product, polythene morpholine sulfonate, was completely soluble in the aqueous alcohol phase. It will be noted that the corresponding amide, polythene sulfomorpholide, which is prepared by an anhydrous reaction between the sulfonyl chloride and morpholine, is insoluble in all combinations of water and isopropanol.

*Example 10*

When the procedure of Example 7 was repeated using 12 grams of triethanolamine (0.08 mol) as the amine, 135 grams of a completely soluble polymer was obtained.

*Example 11*

The experiment of Example 7 was repeated using 7 grams of di-(N-hydroxyethyl)-piperazine (0.04 mol) instead of methyl diethanolamine. On initial concentration, this product was not completely soluble, but when diluted with 235 grams of isopropanol and concentrated again to 177 grams an almost clear solution of the amine salt was obtained.

It will be understood that the details of the above examples may be varied without departing from the spirit of this invention. Thus, in lieu of the polyolefins named in the above examples one may select a polypropylene, the polybutenes- 1 and -2, the polypentenes, the polyhexenes, or in general any commercially available polyolefine of reasonable cost for the purpose in mind.

With reference to reasonable cost of the initial material mentioned above, it will be understood that although the cost of a very high polymer, say an isobutylene of over 120,000 in molecular weight, may not be essentially different from the cost of a lower polymer of the same type, the cost of the corresponding chlorosulfonylated products may differ tremendously, because the lower solubility of the higher polymers requires the use of excessive and uneconomical quantities of solvent in the $Cl_2 + SO_2$ treatment. For this reason, I recommend as preferred practice to start with a polyethylene of an average chain length of between 180 and 2,000 elemental olefine units (e. g. $C_2H_4$, $C_4H_8$, etc.)

The theoretically correct quantity of amine to be employed is two moles per $SO_2Cl$ group, as indicated by the equations under Example 1. This constitutes preferred practice, but some deviation from this practice is permissible. For instance, a slight deficiency of the amine may be employed, whereby to neutralize but part of the $SO_3H$ groups. Excess over the theoretical is also permissible. As a general rule, 80 to 110% of the theoretical quantity will produce satisfactory results.

As indicated in Example 1 above, the added amine acts both as source of cations for the $SO_3H$ groups and as acid absorbing agent for the HCl liberated in the hydrolysis step. Consequently, there is one mole of polyalkanol-amine hydrochloride (or morpholine hydrochloride) formed in the reaction mass for each $SO_2Cl$ group hydrolyzed. This by-product amine-hydrochloride may be separated, if desired, from the film-forming reaction product by dialysis. This is illustrated in the following additional example:

*Example 12.—Dialysis of polyisobutylene diethanolamine sulfonate solution to remove diethanolamine hydrochloride*

Approximately 100 grams of an aqueous alcoholic solution containing 20% polyisobutylene diethanolamine sulfonate of a composition approximately that of the product described in Example 2 were transferred to a small bag of uncoated cellophane and immersed in about 1 liter of water so that the liquid level inside the bag was the same as that of the water bath. After standing several days the solution level inside the bag had risen appreciably above that of the water bath as a result of the diffusion process. By concentrating the aqueous water bath a small amount of diethanolamine hydrochloride was isolated. The residual polymer solution inside the cellophane bag gave a film similar to that of the product in Example 2, except that it showed much less tendency to corrode steel when in contact with a steel surface, and less tendency to discolor paper when applied to a sheet of white paper and exposed to light and air over a period of several weeks.

The degrees of concentration of the reaction product in any of the above examples, and the degree of subsequent dilution may obviously be varied considerably, depending upon the intended use of the product.

In addition of the uses above specifically indicated, my novel compositions of matter in general find utility in the following fields:

1. Grease-proof coatings for paper.
2. Bases for aqueous paints.
3. Bases for floor polish.
4. Vehicles for waxes designed to impart water-repellent finishes to paper, textiles and masonry.
5. Permanent sizes and dimension-stabilizers for textiles.
6. Transitory sizes for textile fiber during textile processing.
7. Adhesives useful as bonding agents in the paper, leather and textile industries, more particularly bookbinding adhesives, general purpose adhesives and heat-sealing adhesives for certain uses.
8. Anti-static agents for nylon.
9. Hair-curling agents.

I claim as my invention:

1. A composition of matter comprising the salt of (1) a polysulfonic acid of a polymerized olefine which contains in the monomeric state from 2 to 6 carbon atoms, and (2) a nitrogenous base selected from the group consisting of the polyethanolamines, the polyisopropanolamines and the morpholines, said composition being characterized by being soluble in at least one medium of the group consisting of water and alcohol-water mixtures, and by forming continuous, thermoplastic, non-saponifiable films when deposited in a thin layer by evaporation of the solvent.

2. A composition of matter as in claim 1, the polymerized olefine being one having an average of at least 180 monomeric units per molecule, and having a sulfur analysis of between 2 and 7%.

3. A composition of matter as in claim 2, the nitrogenous base being diethanolamine.

4. A composition of matter as in claim 2, the nitrogenous base being diisopropanolamine.

5. A composition of matter as in claim 2, the nitrogenous base being morpholine.

6. A process of producing a film-forming, thermoplastic composition of matter which comprises reacting upon a polysulfonyl chloride of a polymerized olefine which contains in the monomeric state from 2 to 6 carbon atoms, in the presence of an aqueous alcoholic medium, with a nitrogenous base selected from the group consisting of the polyethanolamines, the polyisopropanolamines and the morpholines, whereby to effect hydrolysis of the sulfonyl chloride groups to sulfonic acid groups and neutralization of the latter in situ with said nitrogenous base.

7. A process as in claim 6, the polymerized olefine being one having an average of at least 180 monomeric units per molecule, and having a sulfur analysis of between 2 and 7%.

8. A process as in claim 7, the nitrogenous base being diethanolamine.

9. A process as in claim 7, the nitrogenous base bein diisopropanolamine.

10. A process as in claim 7, the nitrogenous base being morpholine.

HARRIS WALTON BRADLEY.

REFERENCES CITED

The following references are of record in the file of this patent:

UNITED STATES PATENTS

| Number | Name | Date |
|---|---|---|
| 2,324,896 | Zerweck | July 20, 1943 |

FOREIGN PATENTS

| Number | Country | Date |
|---|---|---|
| 593,036 | Great Britain | Oct. 7, 1947 |

OTHER REFERENCES

Reynolds et al., J. Am. Chem. Soc., 72, 1587–1593 (April 1950). Presented at New Jersey Meeting of A. C. S. (September 1949).

Certificate of Correction

Patent No. 2,570,094                                                   October 2, 1951

HARRIS WALTON BRADLEY

It is hereby certified that error appears in the printed specification of the above numbered patent requiring correction as follows:

Column 1, line 45, for "pont" read *point*; column 4, line 7, for "1258 grams" read *1248 grams*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*